(12) United States Patent
Browne

(10) Patent No.: US 6,435,933 B1
(45) Date of Patent: Aug. 20, 2002

(54) GAME CALL APPARATUS

(76) Inventor: Robert E. Browne, P.O. Box 67, Sharon, TN (US) 38255

( * ) Notice: Subject to any disclaimer, the term of this patent is extended or adjusted under 35 U.S.C. 154(b) by 0 days.

(21) Appl. No.: 09/989,539

(22) Filed: Nov. 20, 2001

(51) Int. Cl.$^7$ ................................................. A63H 5/00
(52) U.S. Cl. ....................................... 446/207; 446/397
(58) Field of Search ................................. 446/202, 204, 446/205, 207, 208, 209, 397; 43/1, 2; 84/377, 378, 360, 383 A

(56) References Cited

U.S. PATENT DOCUMENTS

| | | |
|---|---|---|
| 2,604,731 A | 7/1952 | Meucci |
| 2,825,180 A | 3/1958 | Dieckmann |
| 2,936,547 A | 5/1960 | Weems |
| 3,928,935 A | 12/1975 | Beadles, Jr. |
| 4,737,130 A | 4/1988 | Mann .......................... 446/207 |
| 4,888,903 A | 12/1989 | Knight et al. ..................... 43/1 |
| 4,940,451 A * | 7/1990 | Leady ......................... 446/202 |
| 4,950,198 A | 8/1990 | Repko, Jr. .................... 446/207 |
| 5,735,725 A | 4/1998 | Primos ....................... 446/207 |
| 6,120,341 A * | 9/2000 | Hafford ....................... 446/202 |
| 6,234,860 B1 * | 5/2001 | Cook .......................... 446/207 |

* cited by examiner

*Primary Examiner*—Jacob K. Ackun
(74) *Attorney, Agent, or Firm*—Garvey, Smith, Nehrbass & Doody, LLC; Charles C. Garvey, Jr.

(57) ABSTRACT

A game call apparatus of improved configuration provides a two part body that includes first and second hollow tubular members that, each have a hollow bore section. The tubular members and provide an open-ended longitudinally extending bore when they are assembled together. The first and second tubular members have correspondingly shaped connectable threads that engage and connect when the two tubular members are assembled together. One of the tubular sections provides a groove to which is attached an O-ring. The o-ring defines a stop that limits travel of one tubular member relative to the other when the threaded connection is made to join them together. By acting as such a stop, the O-ring and threaded connection arrangement insures that the game call will always be reassembled in exactly the same position after it has been disassembled for cleaning. This construction produces an improved game call that has a very consistent, true sound time and again after it has been disassembled and then reassembled during use.

31 Claims, 2 Drawing Sheets

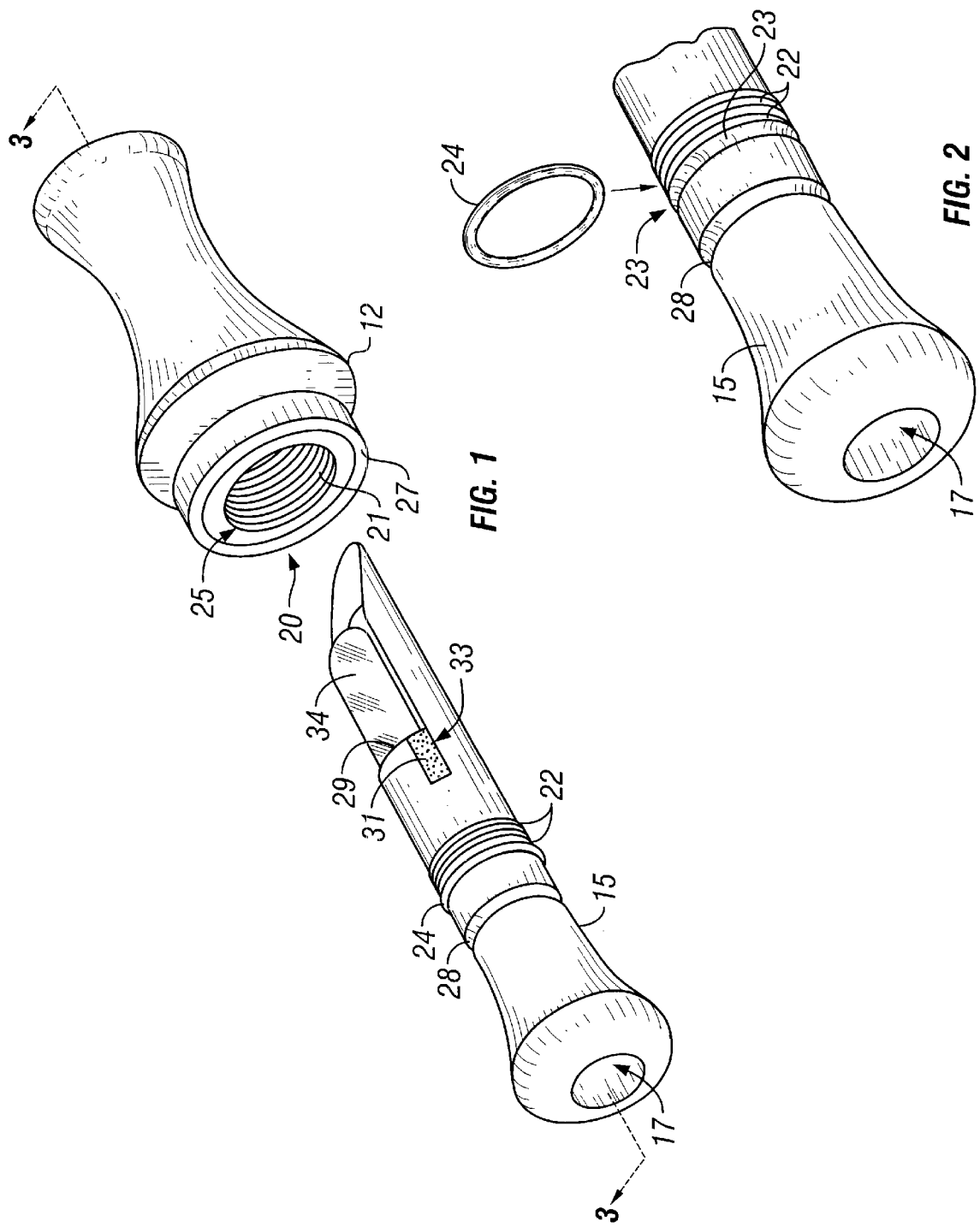

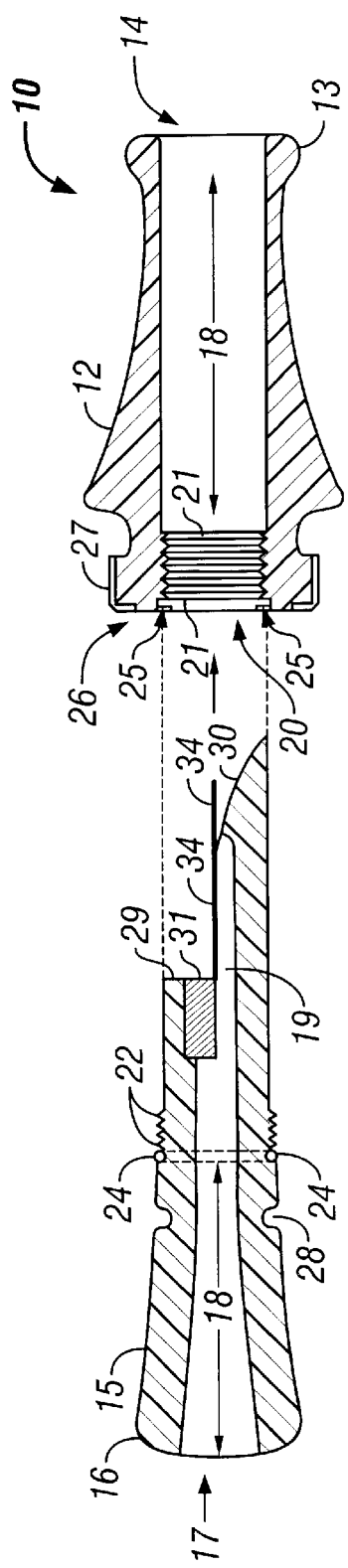
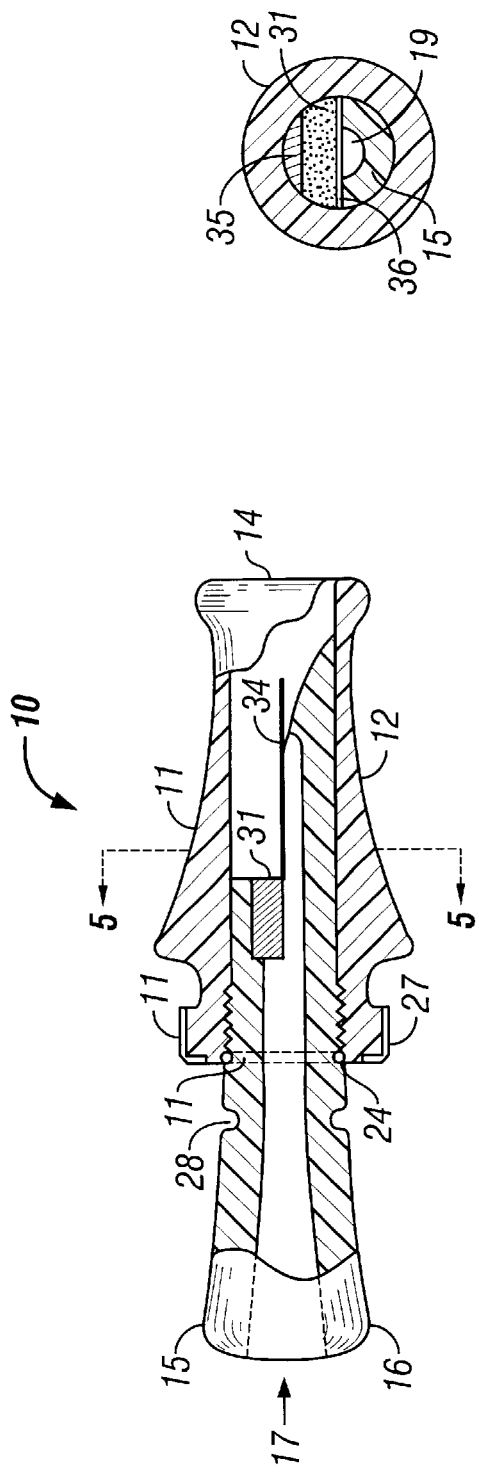
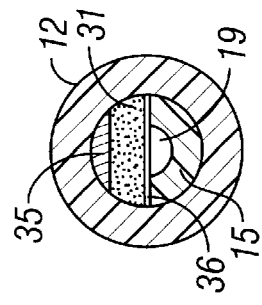
FIG. 3
FIG. 4
FIG. 5

GAME CALL APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to game calls and more particularly to a game call that includes a two part body that is fastened together with correspondingly configured, specially positioned interlocking threads provided respectively on first and second parts of the game call body. An O-ring is positioned to function as a stop for limiting engagement of the threads so that the sound board and reed of the apparatus are always in the proper and same position, (such as after disassembly for cleaning) enabling consistent, repeatable sound generation. The O-ring and thread arrangement also ensures that all of the air generated by a user will be used to produce sound, with little or no leakage of air at a call body connection.

2. General Background of the Invention

Game calls have been used for many, many years by hunters. One of the most popular game calls is a duck call. Duck calls have been sold that are constructed of two parts that are fastened together with a taper lock fit. Game calls typically have a sound board and reed arrangement. A particular call is preliminarily tuned with an as built position of the reed relative to the sound board in order to achieve a desired sound. These types of game calls include not only duck calls, but goose calls, predator calls, crow calls and many others. If the relative positions of the reed, sound board and/or call body parts change, the sound that is produced by the call can change so that the call is ineffective, a very undesirable situation for a hunter.

Taper lock connections between call body parts can cause many problems. If the call is dropped or strikes the side of a boat or blind, the two connected body parts can loosen or shift slightly, varying the sound produced by the call. In cold or rainy or other inclement weather, the call body parts may shift relative to one another. Over time, wear causes the taper lock connection to change relative body part positions, resulting in a change of sound generated by a game call.

Several patents have issued that are directed to game call construction. The following table lists some examples. Some of these calls employ two part constructions that have threaded connections. Some have o-rings as part of their assembly.

| Patent # | Title | Issue Date |
| --- | --- | --- |
| 2,604,731 | Duck Call | 07/29/1952 |
| 2,825,180 | Bird Call | 03/04/1958 |
| 2,936,547 | Animal Call | 05/17/1960 |

-continued

| Patent # | Title | Issue Date |
| --- | --- | --- |
| 3,928,935 | Changeable Game Caller With Two Distinct Sound Systems | 12/30/1975 |
| 4,737,130 | Goose Call | 04/12/1988 |
| 4,888,903 | Game Call | 12/26/1989 |
| 4,950,198 | Game Call | 08/21/1990 |
| 5,735,725 | Modular Game Call System | 04/07/1998 |

The Meucci patent No. 2,604,731 provides a duck call that has some parts that are connected together using a threaded connection. A spring is employed as part of a mechanism to tune the duck call.

U.S. Pat. No. 2,825,180 issued to H. E. Dieckmann discloses a bird call that is comprised of two sections that are threadably engaged as shown in FIGS. 2 and 3 of the '180 patent. A reed is sandwiched between a pair of longitudinally extending tongues that are held by an outer housing. The device includes five basic parts that include the two tongue members, the reed, and the outer housing that is provided in two sections that are threadably engaged.

The Weems Pat. No. 2,936,547 provides an animal call that has an outer body that includes at least two sections that are threadably engaged. One of the sections holds a sound producing mechanism that includes a suitable reed and a packing ring 40.

The Beadles Pat. No. 3,928,935 discloses a game calling device formed of two parts, one a hollow barrel configured member having a mouthpiece at one end, and an air chamber passing therethrough for mating in friction engagement with a keg-contoured member terminating in a truncated portion formed by at least two surfaces, a pair of cylindrically shaped passages extending through the keg portion and each cylindrical passage receiving a set of vibrating reed elements therein. The mating surfaces are retained in friction engagement by means of an O-ring that fits within an annular groove, and the truncated portion is adapted to fit and facilitate being received in an operator's hand so that alternatively the operator's fingers, may completely or partially close off one or the other of the cylindrically shaped openings that extend from the truncated portion.

The Mann Pat. No. 4,737,130 discloses a short mouthpiece for a goose call that is provided with a bushing which telescopically mounts in the mouthpiece bore. A relatively long belled tube mounts to the bushing in order to produce a sound-projecting megaphone effect for the instrument. Further, the reed is truncated in comparison with the reed of a conventional reed assembly, to an extend such that the free end of the reed is substantially coincident with the end edge of the sound trough. Percussive sound, as a result of blowing on the mouthpiece to cause the reed to vibrate, consequently is produced primarily by repetitive flapping of the reed against the side margins of the mouth of the sound trough, a crisper herr-onk break is more easily achieved, and the tendency of moisture or ice to cause the free end portion of the reed to non-vibratingly adhere to the mouth surface of the sound trough is reduced.

In the Knight Pat. No. 4,888,903, there is provided a reed-type game call which can be operated by blowing and sucking on a single end of the call. This permits a caller to make one type of sound when blowing out through the call, and a different or same sound when sucking in, thus allowing for rapid sound successions. This permits the caller to sound like a whole flock of geese, or ducks with the rapid varied sounds; it also permits a hyperventilating deer sound.

The Repko, Jr. Pat. No. 4,950,198 provides a game call that includes a substantially cylindrical body, vibratable diaphragm, split ring for fastening the diaphragm to the body, and tubular bell attachable to the body for amplifying and enhancing the sound produced by the diaphragm. The body includes an inlet end surface having a substantially conical recessed portion, an outlet end surface having two planar surface portions angled with respect to one another, and an air passage extending between the inlet and outlet end surfaces. The air passage has a flared outlet opening at the outlet end surface. The diaphragm is fastened in slightly stretched fashion to the outlet end surface such that it at least substantially covers the flared outlet opening. The diaphragm has a seam in proximate relationship to a periphery portion of the flared outlet portion, along which air from the air passage is permitted to escape.

The Primos Pat. No. 5,735,725 discloses a modular game call system including generally a mouthpiece assembly, a tubular portion, and a resonance producing end. The mouthpiece assembly can be completely removed from the call to enable the tubular section and resonance producing end piece to be used separately with any other type or call. The mouthpiece assembly includes a detachable snap-on diaphragm that insures accurate, consistent tension of the membrane to allow high quality tones to be produced. Alternatively, a sheet of membrane material can be attached to the end of the mouthpiece assembly to create high quality tones. The resonance producing end piece allows the call to produce a resonant sound highly similar to a bugling bull elk.

BRIEF SUMMARY OF THE INVENTION

The present invention provides an improved game call that is produced a very repeatable call sound, even after being disassembled for cleaning. The present invention provides an improved game call that is produced a very repeatable call sound, even after being dropped or banged against a boat, blind, tree or other object.

The present invention features a two part body that includes first and second tubular members that each have a hollow open ended part. The two part body provides an elongated open-ended bore when the two hollow tubular members are assembled together. The assembled body has opposed air delivery and air discharge end portions.

An opening on the first tubular member defines the air delivery opening located at the air delivery end portion of the body.

An opening on the second tubular member is an air discharge opening located at the air discharge end portion of the body.

An internally threaded socket on the first tubular member is provided opposite the air delivery opening end portion of the body. An annular shoulder is provided next to the internally threaded socket at an extreme end of the first tubular member. The threads of the socket are thus in between the annular shoulder and the air delivery opening.

The second hollow tubular member has a sound board. A reed is attached to the body and positioned next to the sound board.

An externally threaded section of the second tubular member is provided on a part of the second tubular member that fits inside the hollow part of the first tubular member. This externally threaded portion of the second tubular member is located in between the sound board and the air discharge end of the call body.

An O-ring is provided on the second tubular member that defines a stop for limiting the travel of the first tubular member when it is threadably engaged with the second tubular member. The O-ring rests against the annular shoulder that is on the first tubular member when the first and second tubular members are connected together by engaging their respective threads.

The O-ring is positioned on the body in between the air delivery opening and the threaded connection to form a seal. This seal prevents debris rain water or other external moisture from reaching the threaded portions of the connected tubular members.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a perspective exploded view of the preferred embodiment of the apparatus of the present invention;

FIG. 2 is a partial perspective view of the preferred embodiment of the apparatus of the present invention illustrating one of the call body sections;

FIG. 3 is a sectional exploded view of the preferred embodiment of the apparatus of the present invention;

FIG. 4 is a longitudinal sectional view of the preferred embodiment of the apparatus of the present invention; and FIG. 5 is a sectional view taken along lines 5—5 of FIG. 4.

DETAILED DESCRIPTION OF THE INVENTION

In FIGS. 1–5, the improved game call apparatus of the present invention is designated generally by the numeral 10. Game call apparatus 10 includes a body 11 that is preferably a two part body. The body includes a first tubular member 12 and a second tubular member 15. The body 11 can be fabricated from any material that can be machined, turned, or molded such as metal, plastic, wood, or the like. For example, the body 11 can be of turned acrylic as is used presently for many commercially available, "high end" duck calls.

The first and second tubular members 12, 15 are connected together with a threaded connection that includes externally threaded section 22 on second tubular member 15 and internally threaded section 21 at socket 20 of first tubular member 12. The threaded connection can be of any thread pattern or size. Threads can be standard, metric, NPT, fine, coarse, multi-lead or bayonet as examples.

Each of the tubular members 12, 15 has a longitudinally extending bore. The first tubular member 12 is provided with bore 18, The second tubular member 15 is provided with bore 19.

When the two tubular members 12, 15 are assembled together as shown in FIG. 4, the bore sections 18, 19 define a common open ended bore that extends between the air delivery opening 14 and air discharge opening 17.

An annular groove 23 is provided on the second tubular member 15 as shown in FIGS. 2 and 3. This annular groove 23 is sized and shaped to receive and hold O-ring 24. The position of the O-ring 24 as it occupies groove 23 is shown in FIGS. 1, 3 and 4.

In FIGS. 1, 2, 3, and 4, the annular groove 23 and O-ring 24 are specifically positioned at one end portion of the external threads 22 that is spaced away from reed 34. The O-ring 24 is thus positioned in between external threads 22 and the air discharge end opening 17. This placement of the O-ring 24 in combination with an annular shoulder 25 on first tubular member 12 provides a specific and precise relative positioning of the first tubular member 12 relative to the second tubular member 15 when they are assembled together in the fully threaded, connected position of FIG. 4. The annular shoulder 25 is provided next to annular exposed face 26 of first tubular member 12. As shown in FIGS. 1, 3 and 4, the annular shoulder 25 that receives O-ring 24 is positioned at an end portion of first tubular member 12 that is opposite air delivery opening 14 and air delivery end 13.

In such a fully assembled position, the annular shoulder 25 of first tubular member 12 is engaged by the O-ring 24 on second tubular member 15. The O-ring 24 and annular shoulder 25 defines stops that engage and prevent further threaded engagement of the tubular members 12, 15 relative to one another. When the tubular members 12, 15 are assembled together, the O-ring 24 and annular shoulder 25 engage and stop further movement of one tubular member 12 relative to the other 15, This construction providing a precise positioning of one tubular member 12 relative to the other 15 every time the call is disassembled for cleaning and then reassembled. For hunters, this ensures that the call will be of the same quality each time that it is used.

When the internally threaded section 21 and externally threaded sections 22 are threadably engaged (see FIGS. 3–4), the O-ring 24 that occupies annular groove 23 defines a stop limiting the threaded engagement of one tubular member 12 to the other tubular member 15. In this fashion, the two tubular members 12, 15 are always in exactly the same position, one tubular member 12 relative to the other 15 upon assembly. This insures that the call will have a consistent reproducible sound when it is taken apart for cleaning and then reassembled.

An external ring 27 can be provided at the connection between the threads 22 and the threads 21, providing reinforcement in the event that the call body 11 is made of a brittle material such as plastic or wood.

A sound board 30 and retainer 31 are shown in FIGS. 1, 3, 4 and 5. In FIG. 1, a recess 33 is provided on second tubular member 15. The recess 33 is defined by preferably generally parallel flat surfaces 35, 36 (see FIG. 5). The recess 33 is occupied by reed 34 and retainer 31 as shown in FIGS. 1, 3 and 4. The retainer 31 can be of a soft yet durable material such as rubber or cork. The reed 34 can be made of any known material that has been used for reeds (eg. metal, plastic) in the prior art. Reed is a well known, commercially available part. The sound board 30 is provided at an end portion of second tubular member 15 generally opposite air discharge end portion 16. It can be an integral part of the second tubular member 15.

A lanyard groove 28 can be provided for attaching a lanyard, rope or other tether to the call body 11.

Parts List

The following is a list of suitable parts and materials for the various elements of the preferred embodiment of the present invention.

| Part No. | Description |
| --- | --- |
| 10 | game call apparatus |
| 11 | body |
| 12 | first tubular member |
| 13 | air delivery end |

-continued

| Part No. | Description |
| --- | --- |
| 14 | air delivery opening |
| 15 | second tubular member |
| 16 | air discharge end |
| 17 | air discharge opening |
| 18 | bore |
| 19 | bore |
| 20 | socket |
| 21 | internally threaded section |
| 22 | externally threaded section |
| 23 | annular groove |
| 24 | O-ring |
| 25 | annular shoulder |
| 26 | annular exposed face |
| 27 | external ring |
| 28 | lanyard groove |
| 29 | transverse face |
| 30 | sound board |
| 31 | retainer |
| 33 | recess |
| 34 | reed |
| 35 | surface |
| 36 | surface |

The foregoing embodiments are presented by way of example only; the scope of the present invention is to be limited only by the following claims.

What is claimed is:

1. A game call apparatus comprising:

a) a two part body that includes first and second hollow tubular members that each have a hollow part providing together a bore when the tubular members are assembled together, a portion of the second tubular member being secured within the hollow part of the first tubular member, the assembled body having air delivery and air discharge end portions;

b) an opening on the first tubular member that is an air delivery opening at the air delivery end portion of the body;

c) an opening in the second tubular member that is an air discharge opening at the air discharge end portion of the body;

d) an internally threaded socket on the first tubular member opposite the air delivery opening end portion of the body;

e) the second hollow tubular member having a sound board;

f) a reed attached to the body and positioned next to the sound board;

g) an externally threaded section on the second tubular member that fits inside the hollow part of the first tubular member;

h) an O-ring on the second tubular member that defines a stop for limiting the travel of the first tubular member when it is threadably engaged with the second tubular member, the O-ring being positioned on the body in between the air delivery opening and the externally threaded section to form a seal that prevents air dispensed to the air delivery opening from reaching the threaded connection.

2. The game call apparatus of claim 1 wherein the threaded sections are of a standard thread pattern.

3. The game call apparatus of claim 1 wherein the threaded sections are of a metric thread pattern.

4. The game call apparatus of claim 1 wherein the threaded sections are of an NPT thread pattern.

5. The game call apparatus of claim 1 wherein the threaded sections are of a multi-lead thread pattern.

6. The game call apparatus of claim 1 wherein the threaded sections are of a standard fine pattern.

7. The game call apparatus of claim 1 wherein the threaded sections are of a standard coarse pattern.

8. The game call apparatus of claim 1 wherein the call body is of a material that can be machined.

9. The game call apparatus of claim 1 wherein the call body is of a material that can be molded.

10. The game call apparatus of claim 1 wherein the call body is of a material that can be turned on a lathe.

11. The game call apparatus of claim 1 further comprising an annular shoulder on the first tubular member next to the internally threaded socket.

12. The game call apparatus of claim 11 wherein the socket has a threaded portion that is positioned at an end portion of the first tubular member opposite the air delivery end portion.

13. The game call of claim 1 wherein the second tubular member has an outer surface, wherein the externally threaded section is on the outer surface.

14. The game call of claim 13 wherein the externally threaded section is in between the reed and the air discharge opening.

15. The game call of claim 1 wherein the o-ring is in between the externally threaded section and the air discharge opening.

16. The game call of claim 15 wherein the o-ring is positioned next to the externally threaded section.

17. The game call of claim 13 wherein the externally threaded section is spaced away from the reed.

18. The game call of claim 13 wherein the externally threaded section is spaced away from the sound board.

19. A game call apparatus comprising:
  a) a two part body that includes first and second hollow tubular members that each have a hollow part providing together a bore when the tubular members are assembled together, a portion of the second tubular member being secured within the hollow part of the first tubular member, the assembled body having air delivery and air discharge end portions;
  b) an opening on the first tubular member that is an air delivery opening at the air delivery end portion of the body;
  c) an opening in the second tubular member that is an air discharge opening at the air discharge end portion of the body;
  d) an internally threaded socket on the first tubular member opposite the air delivery opening end portion of the body;
  e) the second hollow tubular member having a sound board
  f) a reed attached to the body and positioned next to the sound board;
  g) an externally threaded section on the second tubular member that fits inside the hollow part of the first tubular member;
  h) an o-ring on the seconds tubular member that is positioned in between the air discharge opening and external threads on the outer surface of the second tubular member.

20. The game call of claim 19 wherein the externally threaded section is in between the reed and the air discharge opening.

21. The game call of claim 19 wherein the o-ring is positioned next to the externally threaded section.

22. The game call of claim 19 wherein the externally threaded section is spaced away from the reed.

23. The game call of claim 19 wherein the externally threaded section is spaced away from the sound board.

24. A game call apparatus comprising:
  a) a call body that includes a first hollow tubular member having a bore, and a second tubular member having a bore, the call body having air input and air discharge openings that are part of the bore, the second tubular member having a sound board and a reed attached to the second tubular member next to the sound board;
  b) a threaded connection for connecting the first and second tubular members together that includes a first threaded portion at one end of the first tubular member and a second threaded portion on the second tubular member;
  c) an annular groove on the second tubular member that is positioned in between the second threaded portion and the air discharge opening;
  d) an o-ring that occupies the groove;
  e) the first hollow tubular member having a wall that engages the O-ring when the first and second tubular members are fastened together by engaging the first and second threaded portions.

25. The game call of claim 24 wherein the second tubular member has an outer surface, wherein the externally threaded section is on the outer surface.

26. The game call of claim 25 wherein the externally threaded section is in between the reed and the air discharge opening.

27. The game call of claim 24 wherein the o-ring is in between the externally threaded section and the air discharge opening.

28. The game call of claim 24 wherein the o-ring is positioned next to the externally threaded section.

29. The game call of claim 25 wherein the externally threaded section is spaced away from the reed.

30. The game call of claim 25 wherein the externally threaded section is spaced away from the sound board.

31. A game call apparatus comprising:
  a) a call body that includes a first hollow tubular member having a bore, and a second tubular member having a bore, the call body having air input and air discharge openings that are part of the bore, the second tubular member having a sound board and a reed attached to the second tubular member next to the sound board;
  b) a threaded connection for connecting the first and second tubular members together that includes a first threaded portion at one end of the first tubular member and a second threaded portion on the second tubular member;
  c) an o-ring mounted on the second tubular member in between the reed and the air discharge opening; and
  d) the first hollow tubular member having a portion that engages the o-ring when the first and second tubular members are fastened together by engaging the first and second threaded portions.

* * * * *